Jan. 29, 1963   A. HULSE   3,075,368
DRIVE MECHANISM
Filed Oct. 13, 1960   2 Sheets-Sheet 1

INVENTOR.
ALEXANDER HULSE
BY
McGlew and Toren
ATTORNEYS

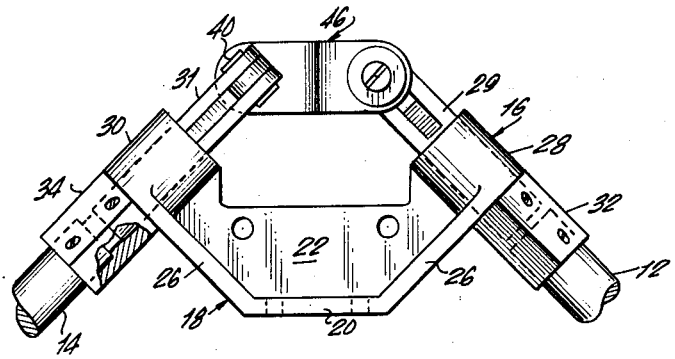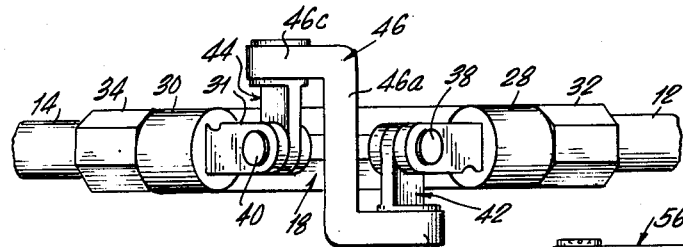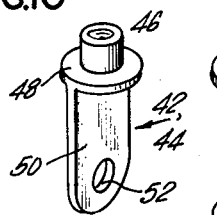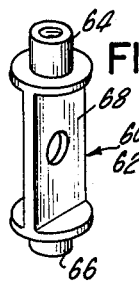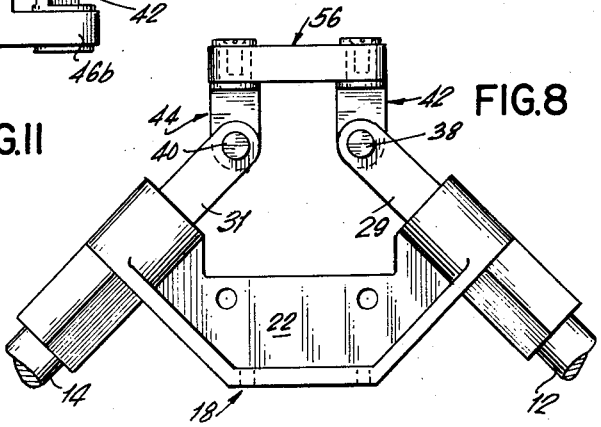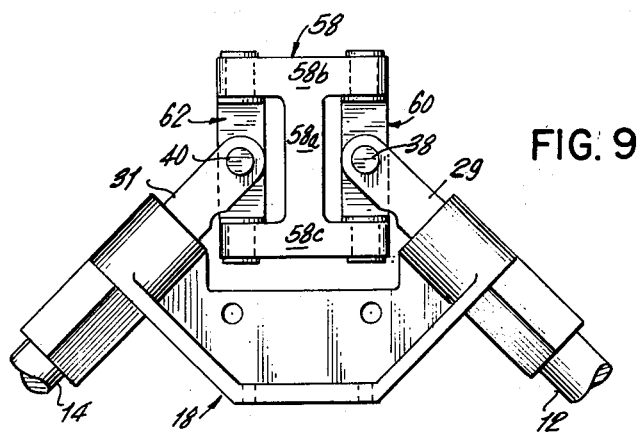

United States Patent Office 3,075,368
Patented Jan. 29, 1963

3,075,368
DRIVE MECHANISM
Alexander Hulse, 166 Vanderbilt Ave.,
Staten Island, N.Y.
Filed Oct. 13, 1960, Ser. No. 62,398
7 Claims. (Cl. 64—20)

This invention relates, in general, to transmission or driving mechanisms and, in particular, to a new and useful crank and linkage mechanism for transmitting rotary motion between non-parallel shafts.

Prior to the present invention, rotational motion could be transmitted between two non-parallel shafts by means of gearing or by a well known "Hooke's joint." A universal joint is also well known for connecting two non-parallel, non-intersecting shafts. The universal joint, of course, consists of a double Hooke's joint.

A disadvantage in each of these types of drive means for effecting rotation of a shaft disposed at an angle from a driving shaft is that the mechanisms for effecting the same are expensive to manufacture and to maintain in operation and disadvantageous backlash and mounting problems are encountered therewith.

The present invention is an improved mechanism comprising a three dimensional linkage arranged to provide rotational motion between shafts which are not parallel.

A feature of the construction of the present invention is the employment of a central link of novel design which forms a rotational bearing for a pair of intermediate crank link members, each of which rotates relatively to the central link and is pivoted to a respective shaft in the drive mechanism. In the mechanism, the central link consists of Z configuration, of an H configuration or of a straight bar configuration.

The mechanism includes a mounting bracket having bearings disposed at angles to receive the respective input and output shafts. Each of the shafts have pivots or extensions with pivots which are located between the bearings and have their axes in alignment in a common plane. The pivots carry intermediate crank links which, in turn, are rotatably mounted in a central link. The arrangement described permits a full transmission of motion from an input shaft to an output shaft disposed at an angle thereto.

The mechanism has substantially no torque capacity limit but is only limited by sizes of the shafts in respect to their own torque limitations. The speeds which may be transmitted are in no way limited. The mechanism in its operation functions with a minimum of or no backlash.

In accordance with one feature of the invention the central link may be designed as a gear, pulley, or sprocket and a single input shaft may, in this manner, be arranged to drive two output shafts each of which are at a distinct angle from the input shaft.

Accordingly, it is an object of this invention to provide an improved drive mechanism.

A further object of this invention is to provide a drive mechanism capable of transmitting rotary motion between shafts arranged at angles to one another.

A further object of the invention is to provide a mechanism for transporting motion from an input shaft to an output shaft arranged at an angle therefrom and comprising a bracket including bearings at each side for rotatably supporting the respective shafts, each of the shafts including a pivot for pivotally supporting a crank link, each of which is rotatably held in its outer end by a central link member.

A further object of the invention is to provide a right angle rotational drive including a central link member rotatably supporting a pair of crank links which have their outer end pivotally connected to the respective shafts for motion transmission.

A further object of the invention is to provide a drive mechanism which is simple in design, rugged in construction, easy to operate and maintain, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described preferred embodiments of the invention.

Figure 1:
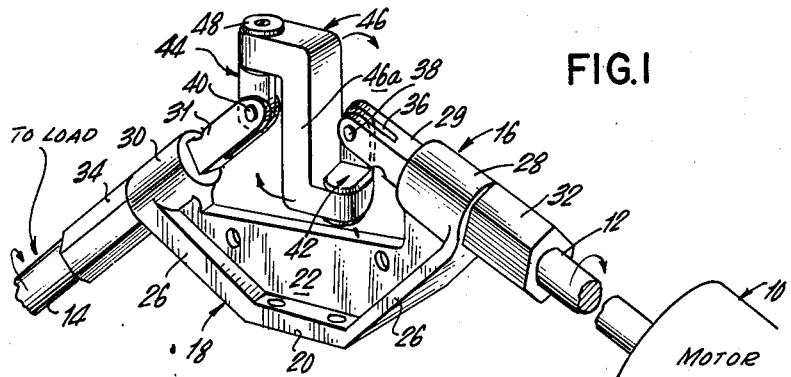
FIG. 1 is a perspective view of a three dimensional drive mechanism constructed in accordance with the invention.
Figure 2:
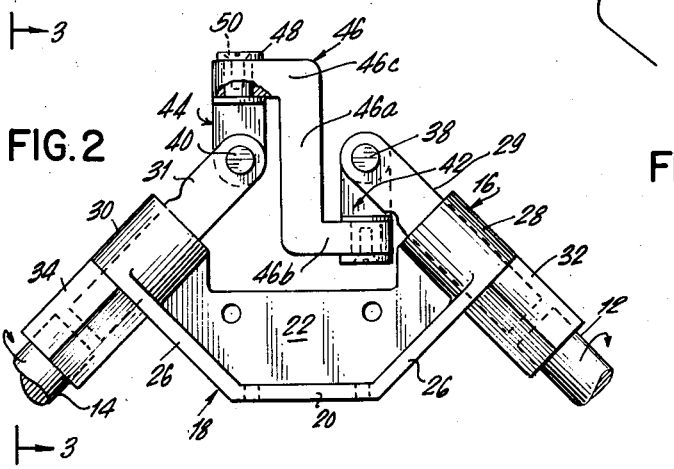
FIG. 2 is a side elevation of the mechanism indicated in FIG. 1.
Figure 3:
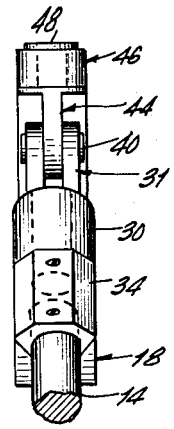
FIG. 3 is an end elevation of the mechanism indicated in FIG. 1.
Figure 4:
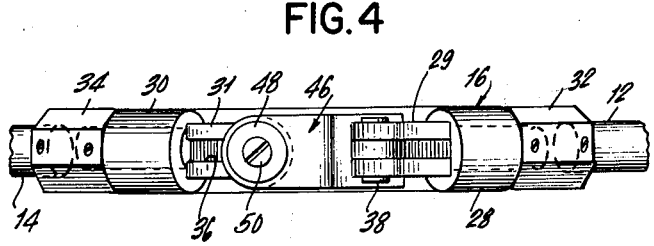
FIG. 4 is a top plan view of the mechanism indicated in FIG. 1.
Figure 5:
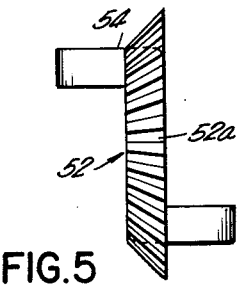

FIG. 5 indicated another embodiment of central link member shown on a somewhat reduced scale;

FIG. 6 is a side elevation similar to FIG. 2 but indicating the mechanism with the shafts rotated one-quarter of a turn;

FIG. 7 is a top plan view of the mechanism indicated in FIG. 6;

FIG. 8 is a side elevation of another embodiment of a three dimensional drive mechanism constructed in accordance with the invention;

FIG. 9 is a side elevation of still another embodiment of three dimensional drive constructed in accordance with the invention;

FIG. 10 is a perspective view of a crank link employed in the embodiment indicated in FIGS. 1 to 8; and FIG. 11 is a perspective view of a crank link employed in the embodiment indicated in FIG. 9.

Referring to the drawings in particular, the invention embodied therein includes a motor or prime mover generally designated 10 having a shaft 12 which transmits motion to an input or load shaft 14 by means of a drive mechanism generally designated 16 which is constructed in accordance with the invention.

In the embodiment indicated, the drive mechanism 16 includes a bracket member generally designated 18 having a flat base 20 which may be bolted to a foundation or support (not shown) and a strengthening web 22 which together with side portions 24 and 26 support motor shaft bearings 28 and input or load shaft bearings 30, respectively. Each shaft 12 and 14 is provided with a positioning nut 32 and 34, respectively, which insures that the shafts are aligned with the outer edge of the bearings 28 and 30, respectively, and which hold shaft extensions 29 and 31, respectively.

In accordance with the invention, each of the shaft extensions 29 and 31 is provided with a slot 36 separating side bearing walls for pivot pins 38 and 40, respectively. Crank links generally designated 42 and 44 are respectively connected to the pivot pins 38 and 40.

Each of the crank pins 42 and 44 are clearly shown in FIG. 10 and comprise a bearing portion 46, a bearing collar 48 spaced inwardly from the ends of the bearing portion 46, and an arm portion 50 having an opening 52 which accommodates the respective pivot pins 38 and 40.

Each of the crank links 42 and 44 is rotatably supported on opposite ends of a central link member generally designated 46. The central link 46 includes a straight central portion 46a connected at each end by parallel arms 46b and 46c which extend outwardly in opposite directions. Arm 46b is connected to the crank link 42 and arm 46c is connected to the crank link 44.

Each of the crank links 42 and 44 have their bearing portions 46 inserted into openings defined in the arms 46b and 46c and they are rotatably supported at such locations. The crank links 42 and 44 are secured by means of a washer 48 which is held against the outside surface of the respective arms 46b and 46c by means of a screw bolt 50.

When the motor 10 is rotated, the shaft 12 or the extension thereof rotates to cause the pivot pin 38 to rotate also. This causes the crank link 42 to move upwardly to shift the position of the central link 46 to the position indicated in FIGS. 6 and 7 upon the completion of one-quarter turn of the driving shaft. The output or load shaft 42 is also turned one-quarter of a revolution as is clearly indicated in the drawings. Complete continued unhindered rotation of each of these shafts is then effected through all angles of revolution and for all variations of speed of the motor 10.

In the embodiment indicated in FIG. 5, a central link generally designated 52 is provided which may be substituted for the link 46. In this instance, the central portion 52a is formed as a gear having teeth 54 which may be arranged to mesh with a gear on another shaft (not shown). Thus, the mechanism shown in FIGS. 1 to 4 and 6 and 7 may be modified by permitting the central link members 46 to be replaced by a central link gear 52 arranged to drive a second output shaft (not shown).

In FIG. 8 the mechanism is similar to that shown in FIGS. 1 to 4 and 6 and 7 with the exception that the central link 46 is replaced by a link 56 which is substantially a straight bar. The other portions of the mechanism are the same and they have been designated similarly. The straight bar 56 includes a bearing opening at each end to receive the respective bearing portions 46 and the crank links 42 and 44, respectively.

In FIG. 9 there is indicated still another embodiment of the drive mechanism in which there is included a central link generally designated 58 which is connected through crank links 50 and 52 to shafts 12 and 14 via extensions 29 and 31, respectively. In FIG. 9 the central link 58 is of H-shaped configuration and includes a central straight portion 58a and parallel end portions 58b and 58c. Each of the parallel end portions 58b and 58c carry bearing openings adjacent each end which accommodate their respective crank links 60 and 62. The crank links 60 and 62 are indicated in FIG. 11 and comprise bearing portions 64 and 66 at each end which are accommodated in the openings of the portion 58b and 58c of the H-shaped central link member 58. A straight central portion 68 of the crank links 60 and 62 is provided with an opening to receive pivot pins 38 and 40 of the respective shaft extensions 29 and 31.

In the mechanisms just described, it is apparent that the center of the axis of the pivots 38 and 40 are maintained on the same plane and the linkage means are arranged to effect uniform driving rotation of the output shaft 14 in response to the rotation of the motor shaft 12. Thus, the mechanism forms a three dimensional drive and is capable of transmitting motion between non-parallel shafts. In the embodiment indicated in FIG. 5, the mechanism is indicated with the central link being employed as a gear in which motion may be delivered to a second output shaft or other types of motion may be effected. The arrangement may be employed for transmitting an exact motion pattern around a 90° bend if desired. The drive linkage can be used as a coupler or, if the center link is replaced by a gear as in the embodiment of FIG. 5, it can drive two output shafts. In addition, the mechanism can be used to transmit uniform motion around two separate bends or angles.

The device finds many useful applications particularly in drives where space requirements are very important, such as in marine and vehicle use and for various automatic appliances.

While specific embodiments of the invention have been shown and described in detail to illustrate the application of the invention principles, those skilled in the art should appreciate that the invention may be embodied otherwise without departing from such principles.

What is claimed is:

1. A drive for transmitting motion between non-parallel shafts, comprising a pair of crank link members each adapted to be pivotally connected to a respective shaft of the drive, and a central link member with outer ends having bearing openings defined therein, said crank link members each having their outer ends rotatably supported in respect to bearing openings of said central link member, said central link member including a central portion formed as a gear.

2. A drive for transmitting motion between non-parallel shafts, comprising a pair of crank link members each adapted to be pivotally connected to a respective shaft of the drive, and a central link member with outer ends having bearing openings defined therein, said crank link members each having their outer ends rotatably supported in respect to bearing openings of said central link member, said central link member being formed as a motion transmitting member such as a gear.

3. A drive for transmitting motion between non-parallel shafts, comprising a central link member having a substantially straight central portion and arm portions extending outwardly in opposite direction from the ends thereof with bearing openings defined therein, a first link member rotatably supported adjacent its one end in one of said bearing openings and having means adjacent its opposite end for pivotally connecting said crank link member to a respective shaft, a second crank link member rotatably supported adjacent its one end in the opposite arm of said central link member and having adjacent its opposite end means for pivotally connecting said crank link member to another shaft.

4. A drive for transmitting motion between two non-parallel shafts, comprising a central substantially straight link member, a first crank link member rotatably mounted in one end of said first link member and having on its end means for pivotally connecting said crank link member to a shaft, and a second crank link member rotatably mounted on the opposite end of said central link member and having means on its free end for pivotally connecting this end to a second shaft, said substantially straight link member being held by said first and second crank link members against axial displacement.

5. A drive for transmitting motion between two non-parallel shafts, comprising a shaft mounting bracket including a first shaft bearing on one side for rotatably supporting a first shaft therein, a second shaft bearing at an opposite side for rotatably supporting a second shaft at an angle to said first shaft, said shafts being disposed so that their axes will meet at an imaginary point between said first and second bearings, first and second crank link members pivotally connected to said first and second shafts, respectively, and a central link member connected between said crank link members, said central link member having a central portion and arm portions extending outwardly therefrom in opposite directions, each of said crank link members being rotatable on said arms at the connection to said central link member.

6. A drive for transmitting motion between non-parallel shafts, comprising a shaft mounting bracket including a first shaft bearing on one side for rotatably supporting a first shaft therein, a second shaft bearing at an opposite side for rotatably supporting a second shaft at an angle to said first shaft, said shaft being disposed so that their axes will meet at an imaginary point between said first and second bearings, first and second crank link members pivotally connected to said first shaft, respectively, and a central link member connected between said crank link members, each of said crank link members being rotatable at the connection to said central link member, said central link member being substantially Z-shaped.

7. A device for transmitting rotation from a motor shaft to an output shaft disposed at an angle therefrom, including a crank link pivotally connected to each of said shafts and a central link connected to each of said crank links, said crank links being rotatable on said central link connection, said central link being held by said crank links against axial displacement during rotation of said shafts.

References Cited in the file of this patent

UNITED STATES PATENTS

| | | |
|---|---|---|
| 125,880 | Clemens | Apr. 23, 1872 |
| 238,454 | State | Mar. 1, 1881 |
| 881,958 | Robinson | Mar. 17, 1908 |
| 1,398,234 | Landis | Nov. 29, 1921 |
| 1,498,712 | York | June 24, 1924 |
| 2,476,473 | Ashton | July 19, 1949 |